March 27, 1962
S. J. HOFF
3,026,980
CENTRIFUGAL CLUTCH WITH CONTROLLED
SELF-ENERGIZING ACTION
Filed Dec. 22, 1958
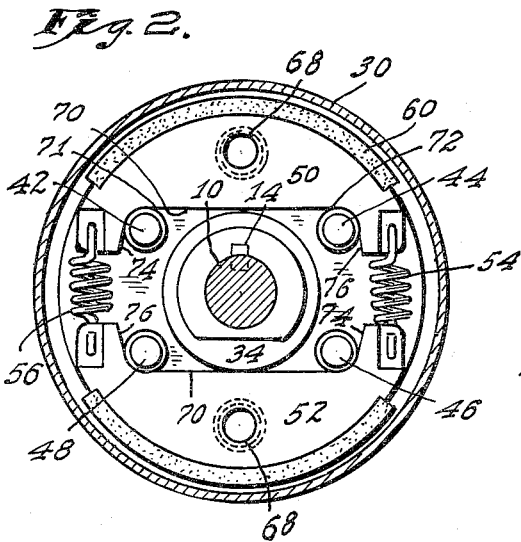
INVENTOR.
STEPHEN J. HOFF.
BY
Schley, Trask & Jenkins
ATTORNEYS.

United States Patent Office 3,026,980
Patented Mar. 27, 1962

3,026,980
CENTRIFUGAL CLUTCH WITH CONTROLLED
SELF-ENERGIZING ACTION
Stephen J. Hoff, Richmond, Ind., assignor to Hoffco, Inc.,
Richmond, Ind., a corporation of Indiana
Filed Dec. 22, 1958, Ser. No. 782,170
9 Claims. (Cl. 192—105)

This invention relates to a centrifugal clutch having improved operating characteristics, and more particularly to a centrifugal clutch having means to control the distribution of engagement pressure along the length of the clutch shoes and in which a self-energizing action of the clutch shoes is controlled by cam means responsive to centrifugal movements of the shoes.

It is a principal object of the invention to provide an improved clutch which gives smooth engagement and a positive drive. It is a further object of the invention to provide a centrifugal clutch having a controlled self-energizing action. It is a further object of the invention to provide a clutch in which inwardly-biased clutch shoes are moved outward by centrifugal force and their drive reaction in engagement with a driven drum is taken by means, such as cam means, tending to move them toward clutch engagement, and in such clutch to control the action thereof, especially to control the distribution of engagement pressure along the length of each shoe, and to control the self-energizing action by and in response to the centrifugal action, so that while positive drive is obtained above predetermined speeds, smooth and non-locking engagement is effected in reaching such speeds. It is a further object of the invention to provide a clutch of improved operating characteristics, in a structure of simple, sturdy, and compact construction, which can be handled as a self-contained unit, which is readily installed and removed, and which will operate over a long life.

In a clutch embodying the invention, a plurality of rigid clutch shoes, conveniently a pair of such shoes, are mounted on a shoe carrier with each shoe biased to retracted, non-engaged, centered position, and with each shoe movable in opposition to such bias by centrifugal force outward into contact with a surrounding driven drum. The drive reaction of each shoe, which tends to move it circumferentially rearward with respect to the direction of drive, is taken, and the shoe is supported on its carrier, by separate supporting means adjacent the leading and trailing ends of the shoe and each of such means exerts a camming or equivalent action requiring or forcing the adjacent portion of the shoe to move outward concurrently with or in response to rearward movement of the shoe in the direction of drive reaction.

From one aspect, the actions of the separate support means for the leading and trailing portions of the shoe may be considered self-energizing actions which are interrelated to control the engagement pressure at one end with respect to that at the other and to distribute the engagement pressure along the circumferential length of the shoe in a desirable way. Desirably, the self-energizing actions are arranged to give substantially equal radially outward movements at the two ends of the shoe with each increment of circumferentially rearward movement of the shoe as a whole in response to drive reaction, in order to obtain a substantially uniform engagement over the whole circumferential length of the shoe and a consequent smooth engaging action of the clutch.

In another aspect, the self-energizing cam adjacent the trailing end of each shoe is considered to be the main cam and to produce the main self-energizing action for substantially the whole length of the shoe, especially when (as in the embodiment shown) the movement of the shoe at such main cam is generally normal to the direction in which both the retracting springs and centrifugal force act on the shoe as a whole. In this aspect, the cam adjacent the leading end of the shoe may be considered essentially a control cam, controlling the movement of the shoe with respect to the main cam and doing so in response to centrifugal movements of the shoe. At such control cam, the movement of the shoe is relatively large, and it occurs in substantially the same direction as the action of the opposed spring bias and centrifugal force. The slope of the control cam is at a small angle to such direction of shoe movement, while the camming output force and movement is generally in the direction of movement of the shoe at the main cam, so that such camming action of the control cam is both highly sensitive to the centrifugal action and highly effective to control the movement of the shoe at the main cam.

The effect is, that the action at the widely-moving leading end of the shoe controls and limits the action at the trailing end of the shoe, and prevents excessive self-energizing action or grabbing. The separate cam means can be so related that no increment of trailing-end engagement can occur unless and until an equivalent engaging action occurs at the leading end in response to centrifugal force acting on the shoe as a whole. The control exerted by the relationship of the trailing-end and leading-end cam means can be varied, as by increasing or decreasing the engagement action at the leading end relative to that at the trailing end. Ordinarily, I prefer to provide substantially equal radially outward movements at the two ends of each shoe, which I find gives smooth engagement as the driving element picks up speed, and positive drive once operating speed is reached. The response of the clutch to centrifugal force, and the speed at which the drive becomes positive, can be varied by varying the tension or spring rate of the shoe-retracting springs.

In a preferred embodiment of the invention, each shoe support comprises a pair of angularly spaced pins or their equivalent, and each shoe is generally symmetrical with respect thereto and straddles such pins, with a generally chordal inner surface resting thereon. The end portions of such surface form trailing-end or main cams—which operate alternately, depending on the direction of drive rotation. Each shoe also has end portions standing inward from the chordal inner surface. Such end portions have inner faces which bear against the outer side faces of the pins and form leading-end or control cams. Shoe-retraction bias is conveniently provided by springs stretched between the adjacent ends of successive shoes. The shoe supporting pins are desirably carried by and connect a pair of side plates which embrace the sides of the shoes.

Further and specific objects and features of the invention will appear from the illustrative embodiment shown in the accompanying drawing and from the following description.

The accompanying drawing illustrates the invention. In such drawing:

FIG. 1 is an axial section of a chain-saw sprocket drive including a clutch embodying my invention;

FIG. 2 is a section taken on the line 2—2 of FIG. 1 and showing the clutch in disengaged position;

FIG. 3 is a view similar to FIG. 2 but showing the clutch in engaged position;

FIG. 4 is an isometric view of a partial sub-assembly of the shoe carrier;

FIG. 5 is an isometric view of the clutch shoe; and

FIG. 6 is an isometric view of the front side plate for assembly with the parts shown in FIG. 4 to complete the shoe carrier.

The clutch installation shown in FIG. 1 is but one example of a variety of applications of the invention. In this application, the driving shaft 10 carries a clutch driving assembly 12 keyed to the shaft by a key 14. The shaft extends beyond the driving assembly 12, and a driven assembly 16 is rotatably mounted thereon by needle bearings 18, between thrust washers 19 and 20, and retained by a chain guard washer 21 secured on the end of the shaft by a nut 22. The driven assembly 16 comprises a sprocket 24, such as is used for driving a saw chain 26, and a clutch drum 30 fixed by means of its web 28 to the inner end of the sprocket and supported thereby for rotation on the axis of the shaft.

The clutch driving assembly 12 includes a pair of clutch shoes 50 and 52 as more fully described below, which upon rotation of the driving shaft 10 move outward into engagement with the clutch drum 30 to clutch that drum and the sprocket to the shaft 10, to drive the chain 26.

The clutch driving assembly 12 comprises a shoe carrier shown in FIGS. 4 and 6, which includes a hub 34 having a key-slotted central opening 36 for reception of the shaft 10. The hub carries a rear side plate 38 and a front side plate 40, both fixedly secured to the hub 34. The front and rear side plates 38 and 40 are also connected by four pins 42, 44, 46, and 48 which are fixedly secured in the side plates and whose outer surfaces form shoe-supporting cam followers for cam surfaces formed on the clutch shoes as described below.

As will be seen in FIGS. 2 and 3, the pins 42 and 44 form a pair of shoe supports at spaced points along a chord of the circular configuration of the shoe carrier, to support a clutch shoe 50. The pins 46 and 48 form a similar pair of shoe supports for a shoe 52, and the two shoes are interconnected at their ends by springs 54 and 56, which draw the shoes to retracted position, out of engagement with the clutch drum 30.

Each clutch shoe 50 and 52 has the configuration shown in FIG. 5. The main body of the shoe is a casting 58 having an outer arcuate recess extending over about 110° in which is secured, as by cementing, a clutch facing 60. Preferably such facing 60 closely fits the recess so that its ends lie closely against abutments 62 at the ends of the shoe. Each end of the casting 58 has an inward projection 59 whose outer portion is formed to provide a central narrow tongue 64 which is drilled to form a hole 66 for engagement of a connecting hook of one of the springs 54 and 56. The holes 66 lie parallel to the axis of the clutch, so that the relative movement of the spring hooks in the holes 66 is a pivotal movement. This requires the spring hooks to be engaged in the holes by movement axially of the clutch assembly, and to facilitate such hook engagement, the overlying edge portions of front side plate 40 are desirably cut away as shown in FIG. 6 to provide convenient clearance. The opposite side plate is desirably of full circular shape, to serve as a substantial closure at the open end of a clutch drum.

The central portion of each shoe casting 58 is provided with a threaded hole 68, and the overlying portions of the side plates 38 and 40 are provided with openings 69 which expose the ends of the threaded holes 68. This permits a pulling tool to be connected to either face of the clutch driving assembly 12, for removing such assembly from a shaft on which it is mounted, without the necessity for access to the periphery of the assembly.

The inner side of each clutch shoe is formed to the configuration shown in FIGS. 2 and 3. This provides a chordal face 70 connected at its ends by curved surfaces to diverging end surfaces 74 and 76. The chordal surface 70 extends from one to the other of the pair of supporting pins 42 and 44 (or 46 and 48) which support the shoe, and the end portions of such surface form cam faces 71 and 72 for cooperation with the pins as cam followers or supports—and which come into effect alternatively depending on the direction of drive rotation. The diverging surfaces 74 and 76 are substantially tangent to the cylindrical surfaces of the two pins, and similarly form cam surfaces which come into effect alternatively depending on the drive direction. In the relationship shown between the cams and the pins, the cam faces 74 and 76 are flat faces which lie at an angle of approximately 105° to the chordal surface 70.

The arrangement of the shoes and their supporting surfaces and pins is symmetrical, so that the clutch driving assembly may be used to drive in either direction and may be mounted either side to on a shaft. Thus, in FIG. 2, if the driving assembly rotates counter-clockwise, the cams 72 and 74 will come into effect, while with clockwise drive the cams 71 and 76 will come into effect. The symmetry serves the further purpose of centering the shoes when they are pulled to retracted position by the springs 54 and 56.

In FIG. 3, which shows the clutch shoes in engaged position against the drum 30, it is assumed that the shaft 10 and the driving assembly 12 are being rotated clockwise, as indicated by the arrow on the face of the hub 34. As such rotation occurs, centrifugal force moves the shoes 50 and 52 outward against the tension of the springs 54 and 56 to carry the linings 60 into contact with the inner surface of the drum 30, which is assumed to be at rest. The shoes 50 and 52 are also moved rearward with respect to the clockwise direction of rotation of the driving assembly, by the drive reaction from their contact with the drum. The action is the same for both shoes 50 and 52, and will be described with reference to the shoe 50 above.

Under the influences noted above, the shoe 50 tends to move counterclockwise with respect to the shoe carrier, and such tendency forces the cam face 71 on the face 50 against the pin 42. Drive reaction is taken by by this engagement of the cam 71 on the pin 42, and such reaction or drag on the shoe 50 tends to slide the cam 71 to the left on the pin 42. This produces a camming action which tends to force the overlying trailing portion of the shoe outward into tighter engagement with the clutch drum. The drag on the shoe also tends to tilt the shoe outward about the pin 42, and this tends to spread forward the engaging effect of the camming action, and this tilting tendency cooperates with the sliding, camming action noted. The overall result is a self-energizing action in which drive reaction of the shoe forces it into tighter engagement with the driven drum. In clutches with camming and self-energizing action at the trailing end only of the shoe, that is, only between the shoe cam 71 and the pin 42, and without a camming or control action at the leading end of the shoe, an uneven, rough, and grabbing or locking action of the clutch occurs. The tilting tendency of the shoe can be directly opposed by the same spring means which oppose centrifugal movement of the shoe, and the resulting self-energization can be directly controlled in response to centrifugal action; and it is the sliding, camming action which is believed to produce the undesirable operating characteristics of the clutch. The invention here overcomes this fault by means of the cam and control mechanism adjacent the leading end of the shoe.

The self-energizing camming action between the pin 42 and cam 71 adjacent the trailing end is interrelated with, and restrained by, a corresponding action between the pin 44 and the cam 76 at the leading end of the shoe. In retracted position of the shoe 50, the cam 76 lies against the pin 44. As the shoe is moved outward and rearward by centrifugal force and drive reaction, the cam 76 at the leading end of the shoe 50 rides on its supporting pin 44, and exerts an outward camming action. This camming action is coordinated with that of the cam 71 so that for every increment of radially outward movement of the trailing end of the shoe 50, the cam 76 produces (or requires) a corresponding, and desirably equal, radially outward increment of movement of the leading end of the shoe 50. The result is that the engagement pressure is evenly distributed along the length of the shoe. This gives smooth engagement and retains sufficient self-energizing action to give a positive drive when centrifugal force sufficiently overcomes the spring retraction force.

In the above mentioned equal distribution of pressure, the two cams 71 and 76 may be considered coordinate. But in another aspect, the cam 71 appears to act as the "main" cam and the cam 76 to act as a "control" cam—and the cams will be referred to as main and control cams in the following.

The geometry is such that in order for the corresponding or equal radial movement of the leading end of the shoe to occur, the leading end of the shoe and the control cam 76 must move a relatively large distance with respect to the cam support and follower pin 44. This is the case because any sliding movement of the shoe in the chordal direction of the cam face 71 with respect to the pin 42 (to the left in FIG. 2) tends to move the leading end of the shoe chordally away from the overlying portion of the drum 30, and a substantial tilting movement of the shoe about its point of engagement with the pin 42 must occur in order first to overcome this separating movement of the leading end from the drum and then to produce the desired radially-outward movement of the leading end of the shoe to bring it into the same degree of engagement as the trailing end of the shoe. Compare the positions of the shoe 50 in FIGS. 2 and 3. It will be noted that for a relatively small sliding movement of the trailing end of the shoe 50 to the left on the pin 42, the leading end of the shoe moves a very much greater distance upward and to the left with respect to the pin 44.

This relatively large distance of movement of the leading end of each shoe with respect to the pin 44 or 48 in engagement with its control cam 76 is almost directly opposed by the springs 54 and 56. In comparison, the springs act nearly normal to the sliding movement of the cams 71 on the pins 42 and 46, and hence exert almost no opposition to such sliding movement. The opposition exerted by the springs against the outward movement of the leading ends of the shoes is overcome, during engagement, by centrifugal force acting on the shoes as a whole. This centrifugal force acts generally upward on the shoe 50 and generally downward on the shoe 52, as shown in FIGS. 2 and 3, in the direction of tension of the springs. This direction of action of the centrifugal force and the springs is not only in substantially the same direction as the large movement at the leading ends of the shoes, but it also lies at only a small angle to the control cam 76. The spring and centrifugal forces are thus readily effective as the primary forces governing the positions of the control cams 76 with respect to their supporting and follower pins 44 and 48. The control cams 76, in turn, exert a powerful control of the sliding movement of the cams 71 on the pins 42 and 46. For example, as the spring 54 pulls the leading end of the shoe 50 downward from its elevated position in FIG. 3, the control cam 76 has a relatively forceful camming action tending to pull the shoe 50 to the right in the direction of the chordal surface 70, and of the cam 71. This relatively powerful camming action easily overcomes the tendency of the drive reaction to move (or hold) the shoe to the left in self-energizing relation between the drum and the pin 42. Conversely, as centrifugal force moves the leading end of a shoe outward, the control cam 76 permits a controlled amount of sliding movement of the cam 71 on the pin 42 in response to drive reaction, and thus permits—and controls—the resulting self-energizing engagement of the clutch.

When a clutch includes not only the cams 71 at the trailing end of the shoes but also the cams 76 at the leading end of the shoes, which I believe act in the manner described above, the net result is a great improvement in clutch operating characteristics in comparison with clutches not having the leading-end cams 76.

I claim as my invention:

1. A centrifugal clutch comprising a driving assembly for clutching engagement with a driven drum, said driving assembly including a shoe carrier and rigid clutch shoes carried by said carrier and having arcuate outer faces for engaging the drum, means underlying the trailing end of each shoe supporting the shoe for both rearward sliding movement and outward pivotal movement, said sliding movement being in a chordal direction at an acute angle to a radius of the assembly, to carry the shoe toward self-energizing engagement with the drum, and said pivotal movement causing relatively substantial movement of the leading end of the shoe relative to said carrier and in a direction substantially transverse to the direction of said sliding movement at the trailing end, and cam means between the leading end of each shoe and the carrier, said cam means at the point of engagement of the shoe with the drum being responsive to inward pivotal movement of the leading end of the shoe to cam the shoe forward away from self-energizing engagement with the drum, and being disposed to move said forward end at an angle of the order of 105° to the direction of said sliding movement, and biasing means biasing said shoes to retracted position and urging the forward end of each shoe in said inward camming direction, said shoes being responsive to centrifugal force to move outward into clutching engagement with a surrounding driven drum.

2. A centrifugal clutch comprising a driving assembly for clutching engagement with a driven drum, said driving assembly including a shoe carrier, rigid clutch shoes carried by said carrier having arcuate outer faces for engaging the drum, a rear support underlying the trailing end of each shoe, a rear cam face on the shoe slidably and pivotally engaged with said support and disposed in a chordal direction at an acute angle to a radius from the axis of the assembly, a front support adjacent the leading end of each shoe, a front cam face on the shoe slidably engaged with said front support, said front cam face being disposed to engage said front support during driving engagement of the shoe with the drum and the rear support, said front cam being responsive to pivotal movement of the shoe with respect to said rear support to control the sliding position of the shoe with respect to the rear support, said front cam face being disposed at an angle of the order of 105° to said rear cam face, spring means urging the forward end of each shoe inward to retract the same from the drum and cause the front cam to cam the shoe forward away from clutching engagement with the drum, said shoes being responsive to centrifugal force to move outward against the force of said spring means into engagement with a driven drum.

3. A centrifugal clutch as set forth in claim 2 in which each of said cam faces extends forward in a direction at an acute angle to the radius intersecting its point of contact with its said support.

4. A centrifugal clutch comprising a driving assembly for clutching engagement with a driven drum, said driving assembly including a shoe carrier and rigid clutch shoes carried by said carrier and having arcuate outer faces for engaging the drum, a pair of shoe-supporting cam followers respectively underlying the leading and trailing ends of each shoe, and cams on the shoe in engagement with said cam followers and extending forwardly thereof in the direction of drive rotation and in camming relation with said followers, each of said cams being operative upon rearward movement of the shoe to urge its shoe end outward into clutching engagement with a surrounding drum, and means biasing said shoes in retracted position, said shoes being movable outward by centrifugal force and rearward by drive reaction, the cam-operating movement of the shoe at the leading-end cam being in a direction substantially transverse to the direction of cam-operating movement of the shoe at the trailing-end cam, and said leading-end cam being disposed at an angle of the order of 105° to the trailing-end cam and being operative to cam the shoe in the direction of cam-retraction movement at the trailing-end cam, whereby the leading-end cam action controls the trailing-end cam action.

5. A centrifugal clutch as set forth in claim 4 wherein said biasing means comprises springs acting generally transverse to the direction of shoe movement at the trailing-end cam and generally in the direction of shoe movement at the leading end of the shoe.

6. A centrifugal clutch as set forth in claim 4 in which each shoe includes cams extending in both directions from the cam followers, whereby the clutch may drive in either direction of rotation.

7. A centrifugal clutch comprising a driving assembly for clutching engagement with a driven drum, said driving assembly including a shoe carrier and a pair of rigid clutch shoes carried by said carrier and having arcuate outer clutch faces for engagement with a surrounding drum, a pair of pin-like supports respectively underlying the leading and trailing ends of each shoe, the shoe having inner cam faces in engagement with said supports and extending substantially parallel with a plane containing the points of engagement with such supports, the shoe also having a flanking cam face in engagement with an outer side face of each support, the flanking cam face at each support being generally transverse to the plane of the inner cam face at the other support of the pair and being inclined at an angle greater than 90° and not substantially exceeding 105° to the plane of the inner cam face at the other support.

8. A centrifugal clutch comprising a driving assembly for clutching engagement with a driven drum, said driving assembly including a shoe carrier and a pair of rigid clutch shoes carried by said carrier and having arcuate outer clutch faces for engagement with a surrounding drum, a pair of shoe supports respectively underlying the leading and trailing ends of each shoe and spaced angularly on said carrier not less than 90°, the shoe having inner cam faces in engagement with said supports and extending toward each other substantially in a common plane, the shoe also having a flanking cam face in engagement with an outer side face of each support, the flanking cam face at each support being generally transverse to the plane of the inner cam face at the other support of the pair, being disposed at an angle greater than 90° to the plane of said opposite inner cam face, and extending toward the end of its shoe at an acute angle to the radius intersecting its point of engagement with its support.

9. A centrifugal clutch comprising a driving assembly for clutching engagement with a driven drum, said driving assembly including a shoe carrier and a pair of rigid clutch shoes carried by said carrier and having arcuate outer clutch faces for engagement with a surrounding drum, a pair of shoe supports respectively underlying the leading and trailing ends of each shoe and spaced angularly on said carrier not less than 90°, the shoe having inner cam faces in engagement with said supports and extending toward each other substantially in a common plane, the shoe also having a flanking cam face in engagement with an outer side face of each support, the flanking cam face at each support being generally transverse to the plane of the inner cam face at the other support of the pair, being disposed at an angle greater than 90° to such plane, and being inclined to control the movement of such inner cam face along such other support during engagement of the shoe, and the cams at the opposite ends of each shoe being inclined to give substantially equal radially outward movement at the two ends of the shoe in response to circumferential movement of the shoe as a whole relative to the shoe supports.

References Cited in the file of this patent

UNITED STATES PATENTS

| 1,956,417 | Else | Apr. 24, 1934 |
| 2,016,177 | Ream | Oct. 1, 1935 |
| 2,725,134 | Pohl | Nov. 29, 1955 |

FOREIGN PATENTS

| 543,724 | Germany | Feb. 9, 1932 |
| 826,724 | France | Jan. 12, 1938 |